(12) United States Patent
Chung et al.

(10) Patent No.: US 9,804,444 B2
(45) Date of Patent: Oct. 31, 2017

(54) LIGHT SOURCE MODULE

(71) Applicant: AU OPTRONICS CORPORATION, Hsin-chu (TW)

(72) Inventors: Wei-Chun Chung, Hsin-chu (TW); Chi-Tang Ma, Hsin-chu (TW); Su-Yi Lin, Hsin-chu (TW); Ming-Lung Chen, Hsin-chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 15/183,268

(22) Filed: Jun. 15, 2016

(65) Prior Publication Data

US 2017/0168353 A1    Jun. 15, 2017

(30) Foreign Application Priority Data

Dec. 11, 2015  (TW) .............................. 104141646 A

(51) Int. Cl.
*G02F 1/1335* (2006.01)
*F21V 7/00* (2006.01)
(Continued)

(52) U.S. Cl.
CPC .......... *G02F 1/133611* (2013.01); *F21V 3/00* (2013.01); *F21V 7/00* (2013.01);
(Continued)

(58) Field of Classification Search
CPC .......... G02F 1/133611; G02F 1/133606; G02F 2001/133607; F21V 3/00; F21V 7/00; F21V 13/02; F21Y 2103/00
See application file for complete search history.

(56) References Cited

U.S. PATENT DOCUMENTS

2007/0070616 A1* 3/2007 Segawa .................. G09F 13/04
362/97.1
2007/0258247 A1* 11/2007 Park ..................... G02B 5/0231
362/326

(Continued)

FOREIGN PATENT DOCUMENTS

| CN | 101629697 A | 1/2010 |
| CN | 203273337 U | 11/2013 |
| CN | 103775903 A | 5/2014 |

*Primary Examiner* — Nathanael R Briggs
(74) *Attorney, Agent, or Firm* — Tim Tingkang Xia, Esq.; Locke Lord LLP

(57) ABSTRACT

A light source module includes a substrate, multiple light sources disposed on the substrate, and multiple three-dimensional optical control structures located above the light sources. Each optical control structure includes a top portion disposed corresponding to the light source and has multiple top light transmissive patterns, a first side portion, and a second side portion. A total area of top light transmissive patterns within a top region divided by an area of the top region is T. The first and second side portions are respectively connected to the top portion, and each has multiple side light transmissive patterns. A total area of multiple side light transmissive patterns within a side region divided by an area of the side region is S. The patterns satisfy: 0.3× (B/A)<S/T<0.6×(B/A), where A represents a width of the top portion, and B represents a distance between an optical control structure and an adjacent optical control structure.

20 Claims, 7 Drawing Sheets

(51) Int. Cl.
*F21V 3/00* (2015.01)
*F21V 13/02* (2006.01)
*F21Y 103/00* (2016.01)

(52) U.S. Cl.
CPC ........ F21V 13/02 (2013.01); G02F 1/133606 (2013.01); *F21Y 2103/00* (2013.01); *G02F 2001/133607* (2013.01)

(56) References Cited

U.S. PATENT DOCUMENTS

| | | | |
|---|---|---|---|
| 2011/0013116 A1* | 1/2011 | Matsuki | G02F 1/133603 349/62 |
| 2011/0109839 A1* | 5/2011 | Zhu | G02F 1/133603 349/62 |
| 2014/0160734 A1* | 6/2014 | Yu | G02F 1/133603 362/97.3 |
| 2015/0085520 A1* | 3/2015 | Liu | G02B 6/0033 362/606 |

* cited by examiner

LIGHT SOURCE MODULE

CROSS-REFERENCE TO RELATED APPLICATIONS

This non-provisional application claims priority under 35 U.S.C. §119(a) on Patent Application No. 104141646 filed in Taiwan, R.O.C. on Dec. 11, 2015, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD

The present invention relates generally to a light source module, and in particular, to a light source module having three-dimensional optical control structures and applications thereof.

BACKGROUND

A liquid crystal display apparatus generally includes a liquid crystal display panel and a light source module, where the light source module is mainly used to provide a surface light source required when the liquid crystal display panel performs display. Generally, light source modules may be classified into two types: a direct type and an edge-lit type according to positions at which light sources of the light source modules are disposed. A light source of a direct type light source module is disposed right below the light source module, and generally, is used for a liquid crystal display of a large size, and a light source of an edge-lit type light source module is disposed at a side of the light source module, and generally, is used for a liquid crystal display of a small size.

In order to prevent non-uniform brightness of a liquid crystal display, generally, an entire optical film is used to make brightness of an entire image uniform, and maintain the brightness of the entire image without losing brightness of a light source. However, in the related art, an optical film used still has a problem of non-uniform light distribution, and further, a spacer needs to be additionally disposed to adequately support the optical film. Therefore, how to change a design of an optical film, omit disposal of a spacer, and implement good light distribution is a subject to be studied currently.

SUMMARY

In one aspect, the present invention provides a light source module, which can omit disposal of a spacer and implement good light distribution.

In certain embodiments, the light source module includes a substrate, a plurality of light sources, and a plurality of three-dimensional optical control structures. The plurality of light sources is disposed on the substrate. The plurality of three-dimensional optical control structures is located above the light sources. Each of the three-dimensional optical control structures covers one of the light sources. Each of the three-dimensional optical control structures includes a top portion, a first side portion, and a second side portion. The top portion is disposed corresponding to the light source, where there is a plurality of top light transmissive patterns within a top region of the top portion, and a total area of the top light transmissive patterns divided by an area of the top region is T. The first side portion and the second side portion are separately connected to the top portion to support the top portion, and the first side portion and the second side portion each have a plurality of side light transmissive patterns. A total area of the side light transmissive patterns within a side region of the first side portion or the second side portion divided by an area of the corresponding side region is S. In certain embodiments, the top light transmissive patterns and the side light transmissive patterns satisfy: 0.3 satisfy: 0.3 missive patterns satisfy: 0.3 satisfy: 0.3 portion divided by an are the three-dimensional optical control structures, and B represents a distance between a three-dimensional optical control structure and an adjacent three-dimensional optical control structure.

In certain embodiments, the three-dimensional optical control structures includes a first three-dimensional optical control structure, a second three-dimensional optical control structure, and a third three-dimensional optical control structure. The second three-dimensional optical control structure and the third three-dimensional optical control structure are located at two sides of the first three-dimensional optical control structure. A distance between the first three-dimensional optical control structure and the second three-dimensional optical control structure is B, a distance between the first three-dimensional optical control structure and the third three-dimensional optical control structure is C, and a width of a top portion of each of the first, second, and third three-dimensional optical control structures is A. A first side portion of the first three-dimensional optical control structure faces the second three-dimensional optical control structure, and a total area of side light transmissive patterns within a first side region of the first side portion divided by an area of the first side region is $S1$. A second side portion of the first three-dimensional optical control structure faces the third three-dimensional optical control structure, and a total area of side light transmissive patterns within a second side region of the second side portion divided by an area of the second side region is $S2$. $0.3\times(B/A)\leq S1/T<0.6\times(B/A)$, and $0.3\times(C/A)\leq S2/T<0.6\times(C/A)$.

In certain embodiments, the light source module further includes a frame. The light sources and the three-dimensional optical control structures are located in the frame. The three-dimensional optical control structures comprise a first three-dimensional optical control structure and a second three-dimensional optical control structure. The first three-dimensional optical control structure is disposed adjacent to a side wall of the frame, and the first three-dimensional optical control structure is located between the side wall of the frame and the second three-dimensional optical control structure. A distance between the first three-dimensional optical control structure and the second three-dimensional optical control structure is B, a distance between the first three-dimensional optical control structure and the frame is D, and a width of a top portion of each of the first and second three-dimensional optical control structures is A. A first side portion of the first three-dimensional optical control structure faces the second three-dimensional optical control structure, and a total area of side light transmissive patterns within a first side region of the first side portion divided by an area of the first side region is $S1$. A second side portion of the first three-dimensional optical control structure faces the side wall of the frame, and a total area of side light transmissive patterns within a second side region of the second side portion divided by an area of the second side region is S2.

$$0.3 \times (B/A) \leq S1/T < 0.6 \times (B/A), \text{ and } 0.3 \times (D/A) \leq S2/T < 0.6 \times (D/A).$$

In certain embodiments, the top portion of each of the three-dimensional optical control structures comprises a top reflection plate and top light transmissive patterns located on the top reflection plate. Each of the first side portion and the second side portion of each of the three-dimensional optical control structures comprises a side reflection plate and side light transmissive patterns located on the side reflection plate.

In certain embodiments, the top light transmissive patterns and the side light transmissive patterns comprise opening patterns, light transmissive material patterns, or a combination thereof.

In certain embodiments, each of the three-dimensional optical control structures further comprises a first bottom portion and a second bottom portion, which are respectively connected to the first side portion and the second side portion, and are fastened on the substrate.

In certain embodiments, a first included angle exists between the first bottom portion and the first side portion, and the first included angle is less than or equal to 90 degrees. A second included angle exists between the second bottom portion and the second side portion, and the second included angle is less than or equal to 90 degrees.

In certain embodiments, sizes of top light transmissive patterns on the top portion of each of the three-dimensional optical control structures increase as distances between the top light transmissive patterns and the light source increase. Sizes of side light transmissive patterns on the first side portion and the second side portion of each of the three-dimensional optical control structures increase as a distance between the side light transmissive patterns and the light source increase.

In certain embodiments, the widths A of the top portions of all of the three-dimensional optical control structures are not exactly the same.

In certain embodiments, the light sources are a plurality of strip light sources or are formed by arranging a plurality of point light sources into a line.

In certain embodiments, the light source module further includes a diffusion film, located above the three-dimensional optical control structures.

In certain embodiments, the light source module further includes a support component, to support the diffusion film.

Another aspect of the present disclosure relates to a liquid crystal display device, which includes a liquid crystal display panel and a light source module as disclosed in any of the embodiments as described above.

Based on the foregoing description, the light source module according to certain embodiments of the present invention includes three-dimensional optical control structures, and top light transmissive patterns and side light transmissive patterns satisfy: $0.3 \times (B/A) \leq S/T < 0.6 \times (B/A)$. Therefore, the light source module can be used to omit disposal of a spacer, greatly reduce use of materials, and resolve a problem of non-uniform light distribution.

To make the foregoing features and advantages of the present invention more comprehensible, embodiments are particularly listed below with reference to the accompanying drawings, which are described in detail below.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
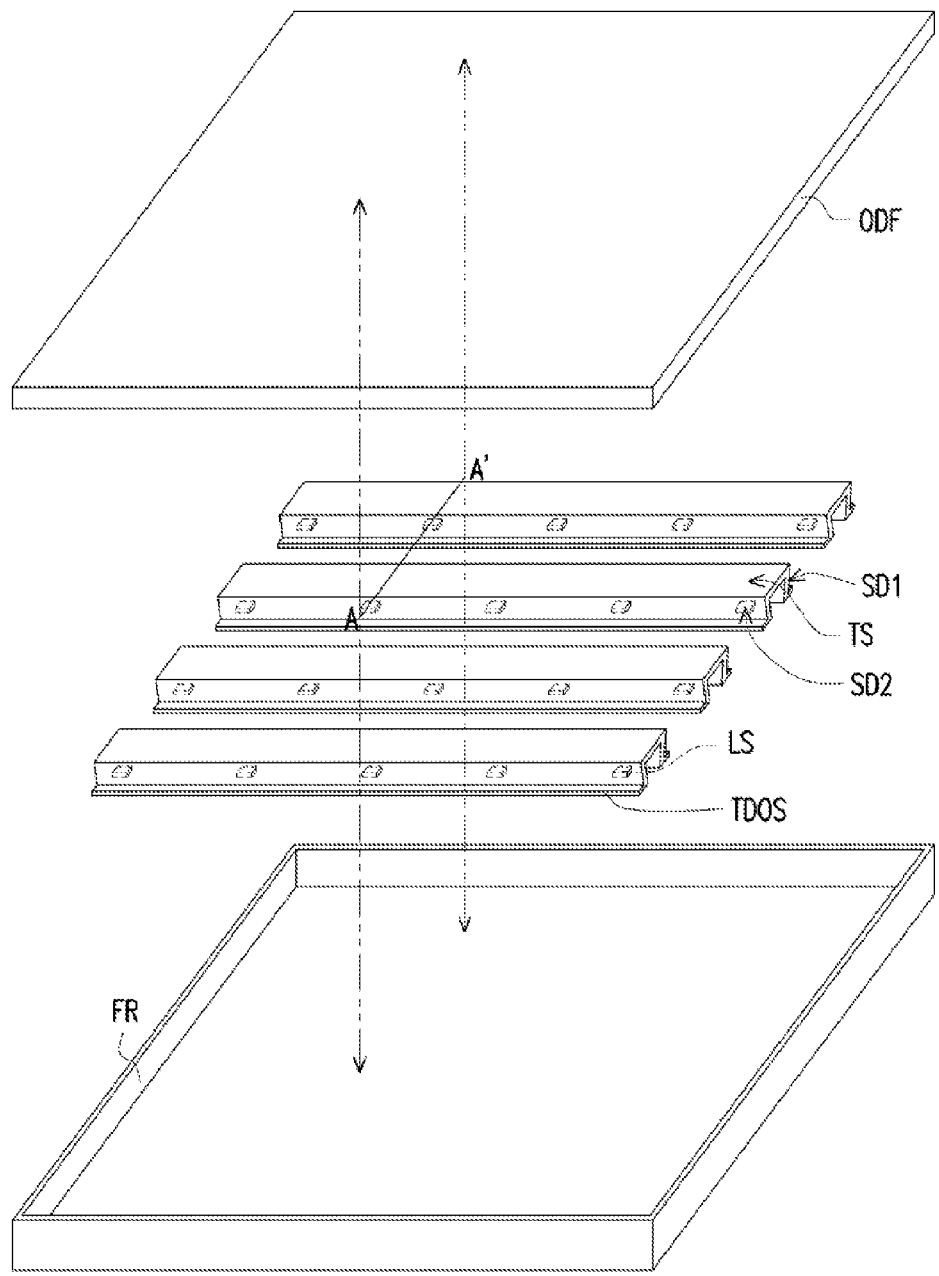
FIG. 1 is a schematic exploded view of a light source module according to an embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-18. In accordance with the purposes of this invention, as embodied and broadly described herein, this invention, in one aspect, relates to a touch panel.

Figure 2A:
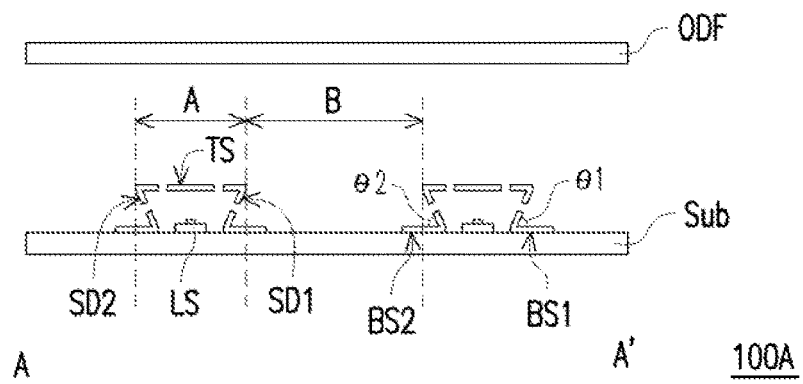
FIG. 2A is a schematic sectional view along a section line A-A' as shown in FIG. 1.
Figure 2B:
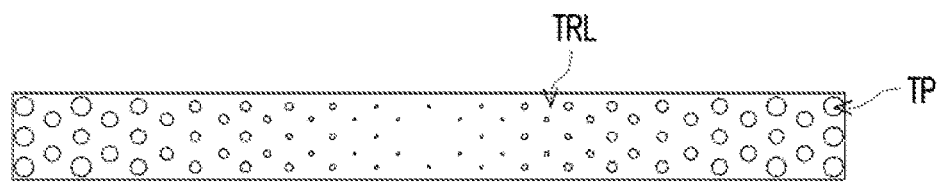
FIG. 2B is a front view of a top portion TS of a three-dimensional optical control structure as shown in FIG. 1.
Figure 2C:
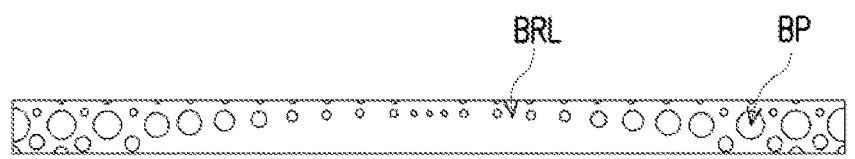
FIG. 2C is a front view of a first side portion SD1/a second side portion SD2 of a three-dimensional optical control structure as shown in FIG. 1.

FIG. 1 is a schematic exploded view of a light source module according to an embodiment of the present invention. FIG. 2A is a schematic sectional view along a section line A-A' as shown in FIG. 1. FIG. 2B is a front view of a top portion TS of a three-dimensional optical control structure as shown in FIG. 1. FIG. 2C is a front view of a first side portion SD1/a second side portion SD2 of a three-dimensional optical control structure as shown in FIG. 1. In certain embodiments, referring to FIGS. 1 and 2A-2C, a light source module 100A includes a substrate Sub, a plurality of light sources LSs, a plurality of three-dimensional optical control structures TDOSs, and a frame FR. The substrate Sub and the frame FR, for example, are formed at the same time, and are of a same material, where the light sources LSs and the three-dimensional optical control structures TDOSs are disposed in the frame FR. The plurality of three-dimensional optical control structures TDOSs is located above the plurality of light sources LSs, and each of the three-dimensional optical control structures TDOSs covers one of the light sources LSs.

In this embodiment, the light sources LSs are a plurality of strip light sources or are formed by arranging a plurality of point light sources into a line, but are not limited thereto. In certain embodiments, for light sources LSs, an arrangement of the light sources LSs in the frame FR may be changed according to a requirement. For example, in the embodiment in FIG. 1, the light sources LSs are arranged horizontally. However, in another embodiment, the light sources LSs may be arranged vertically. In addition, in this embodiment, a three-dimensional optical control structure TDOS that covers a light source LS is designed integrally, but is not limited thereto. In another embodiment, a three-dimensional optical control structure TDOS may have a segmented design, to cover the light source LS in a segmented manner.

Each of the three-dimensional optical control structures TDOSs includes a top portion TS, a first side portion SD1, and a second side portion SD2. The top portion TS is disposed corresponding to the light source LS, and has a plurality of top light transmissive patterns TPs and a top reflection plate TRL. Referring to FIG. 2B, sizes of the top light transmissive patterns TPs located on the top portion TS increase as distances between the top light transmissive patterns TPs and the light source LS increase. In other words, in FIG. 2B, only one light source LS corresponds to the middle of the shown top portion TS, and a top light transmissive pattern TP that is close to the light source LS has a relatively small size.

In certain embodiments, the first side portion SD1 and the second side portion SD2 are separately connected to the top portion TS to support the top portion TS. The first side portion SD1 and the second side portion SD2 each have a plurality of side light transmissive patterns BPs and a side reflection plate BRL. Referring to FIG. 2C, sizes of the side light transmissive patterns BPs located on the first side portion SD1 and the second side portion SD2 increase as distances between the side light transmissive patterns BPs and the light source LS increase. In other words, in FIG. 2C, only one light source LS corresponds to the middle of the shown first side portion SD1 and second side portion SD2, so that a side light transmissive pattern BP that is close to the light source LS has a relatively small size.

In certain embodiments, a total area of top light transmissive patterns TPs within a top region of the top portion TS divided by an area of the top region is T, and a total area of side light transmissive patterns BPs within a side region of the first side portion SD1 or the second side portion SD2 divided by an area of the side region is S. Particularly, the top light transmissive patterns TPs and the side light transmissive patterns BPs need to satisfy: $0.3 \times (B/A) < S/T < 0.6 \times (B/A)$, where A represents a width of the top portion TS, and B represents a distance between a three-dimensional optical control structure TDOS and an adjacent three-dimensional optical control structure TDOS. When the top light transmissive patterns TPs and the side light transmissive patterns BPs satisfy the foregoing condition, the light source module 100 can achieve an effect of uniform light distribution, and prevent a phenomenon of non-uniform brightness of an image. In addition, in this embodiment, the top light transmissive patterns TPs and the side light transmissive patterns BPs are opening patterns (not shown in FIG. 1). Therefore, light emitted by the light source LS can be uniformly transmitted to the outside of the light source module by using the opening patterns.

Then, continue to refer to FIGS. 1 and 2A, each of the three-dimensional optical control structures TDOSs further include a first bottom portion BS1 and a second bottom portion BS2, which are respectively connected to the first side portion SD1 and the second side portion SD2, and are fastened on the substrate Sub. In certain embodiments, a first included angle $\theta 1$ exists between the first bottom portion BS1 and the first side portion SD1, and the first included angle $\theta 1$ is less than or equal to 90 degrees. Similarly, a second included angle $\theta 2$ exists between the second bottom portion BS2 and the second side portion SD2, and the second included angle $\theta 2$ is less than or equal to 90 degrees. Because the three-dimensional optical control structure TDOS of the present invention includes the first bottom portion BS1 and the second bottom portion BS2, a spacer does not need to be additionally provided to support the three-dimensional optical control structure TDOS. Specifically, compared with a conventional design of an entire layer of optical film, a design of the three-dimensional optical control structure TDOS of the present invention has greatly reduced an area of a film die; therefore, related material and assembly costs can be reduced. Similarly, because an area of the three-dimensional optical control structure TDOS of the present invention is smaller than that of a conventional optical film, a quantity of drills of dies required to form an opening pattern and die costs can be greatly reduced.

In certain embodiments, the light source module 100A in this embodiment may further include a diffusion film ODF and a support component (not shown). Particularly, the diffusion film ODF is located above the three-dimensional optical control structures TDOSs, and the support component is used to support the diffusion film ODF. It should be noted that, the support component is only used to support the diffusion film ODF, and does not need to support the three-dimensional optical control structure TDOS. As described above, the three-dimensional optical control structure TDOS itself already has a support effect. Disposal of the diffusion film ODF can further enable the light source module 100 to implement more uniform light distribution.

Figure 3A:
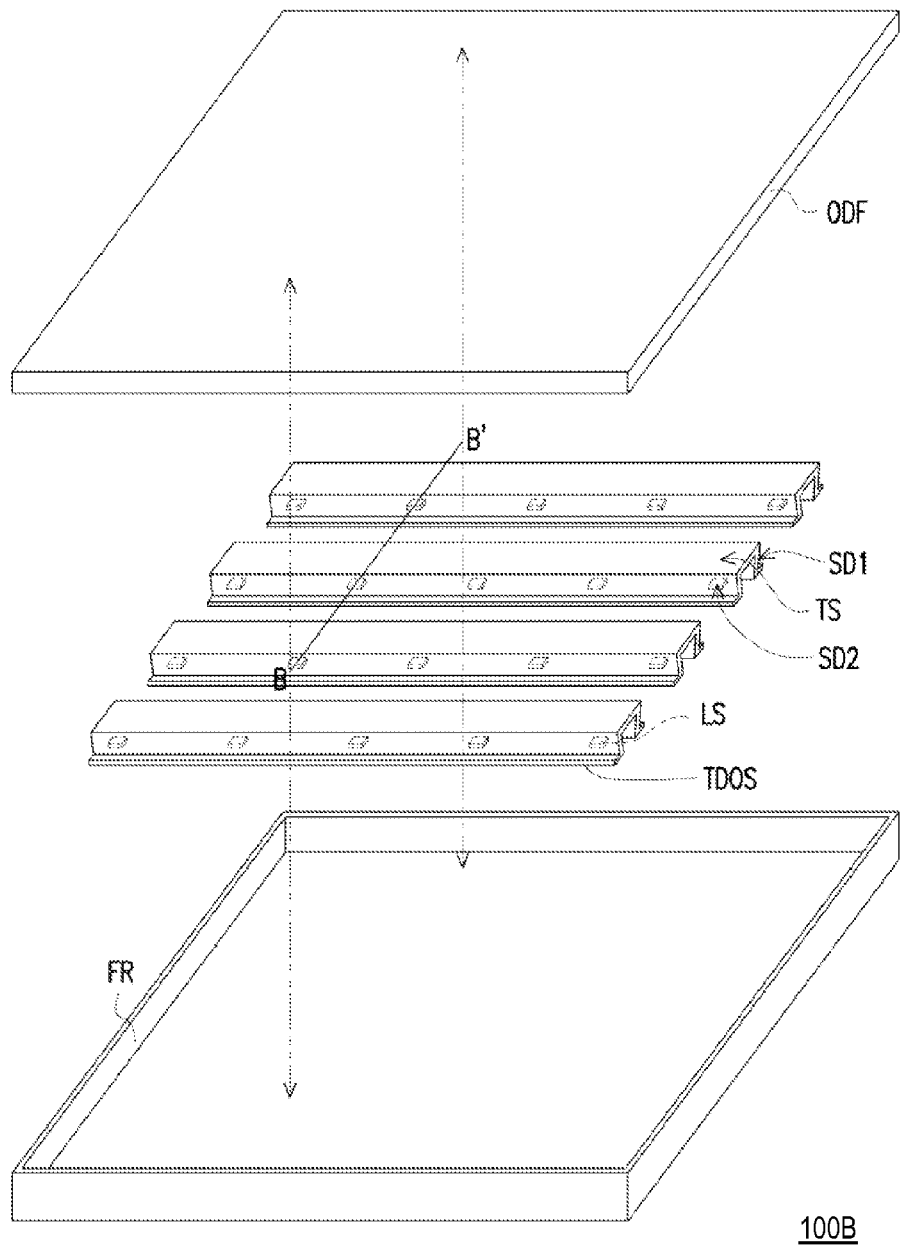
FIG. 3A is a schematic exploded view of a light source module according to an embodiment of the present invention.
Figure 3B:
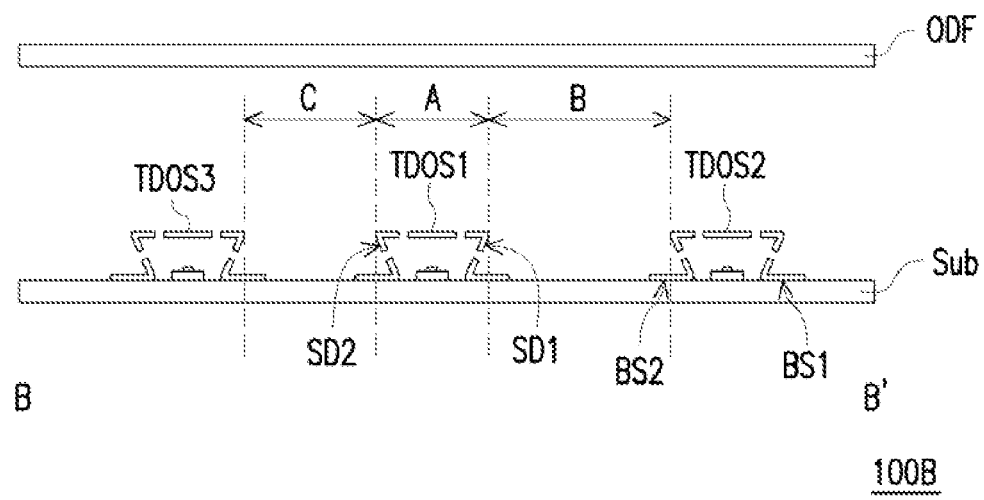
FIG. 3B is a schematic sectional view along a section line B-B' as shown in FIG. 3A.

FIG. 3A is a schematic exploded view of a light source module according to an embodiment of the present invention. FIG. 3B is a schematic sectional view along a section line B-B' as shown in FIG. 3A. A light source module 100B in FIG. 3A is the same as the light source module 100 shown in FIG. 1, and is only used to describe different section views of the light source module 100B. Therefore, same elements are represented by using same symbols and are not described in detail again. Specifically, FIG. 3B is a schematic sectional view of any three three-dimensional optical control structures TDOSs in FIG. 3A, and a description of each of the three-dimensional optical control structure TDOSs is the same as that of the three-dimensional optical control structure TDOS shown in FIG. 2A; therefore, some elements are not shown, and reference may be made to the foregoing descriptions for definition. In the sectional view shown in FIG. 3B, the three-dimensional optical control structures TDOSs include a first three-dimensional optical control structure TDOS1, a second three-dimensional optical control structure TDOS2, and a third three-dimensional optical control structure TDOS3. The second three-dimensional optical control structure TDOS2 and the third three-dimensional optical control structure TDOS3 are located at two sides of the first three-dimensional optical control structure TDOS1.

In certain embodiments, a distance between the first three-dimensional optical control structure TDOS1 and the second three-dimensional optical control structure TDOS2 is B, and a distance between the first three-dimensional optical control structure TDOS1 and the third three-dimensional optical control structure TDOS3 is C. The distance B and the distance C may be the same or may be different. A width of a top portion TS of each of the first three-dimensional optical control structure TDOS1, the second three-dimensional optical control structure TDOS2, and the third three-dimensional optical control structure TDOS3 is A. In certain embodiments, a first side portion SD1 of the first three-dimensional optical control structure TDOS1 faces the second three-dimensional optical control structure TDOS2, and a total area of side light transmissive patterns BPs with a first side region of the first side portion SD1 divided by an area of the first side region S1. A second side portion SD2 of the first three-dimensional optical control structure faces the third three-dimensional optical control structure TDOS3, a total area of side light transmissive patterns BPs within a second side region of the second side portion SD2 divided by an area of the second side region is S2, and $0.3\times(B/A)\le S1/T<0.6\times(B/A)$ and $0.3\times(C/A)\le S2/$ $T<0.6\times(C/A)$. When the first three-dimensional optical control structure TDOS1, the second three-dimensional optical control structure TDOS2, the third three-dimensional optical control structure TDOS3, and the side light transmissive patterns BPs satisfy the foregoing condition, the light source module 100B can achieve an effect of uniform light distribution, and prevent a phenomenon of non-uniform brightness of an image.

Similarly, in FIG. 3B, because the first three-dimensional optical control structure TDOS1, the second three-dimensional optical control structure TDOS2, and the third three-dimensional optical control structure TDOS3 each include a first bottom portion BS1 and a second bottom portion BS2, a spacer does not need to be additionally provided to support each of the three-dimensional optical control structures. In other words, designs of the first three-dimensional optical control structure TDOS1, the second three-dimensional optical control structure TDOS2, and the third three-dimensional optical control structure TDOS3 can also achieve effects of reducing material and assembly costs and the like.

Figure 4A:
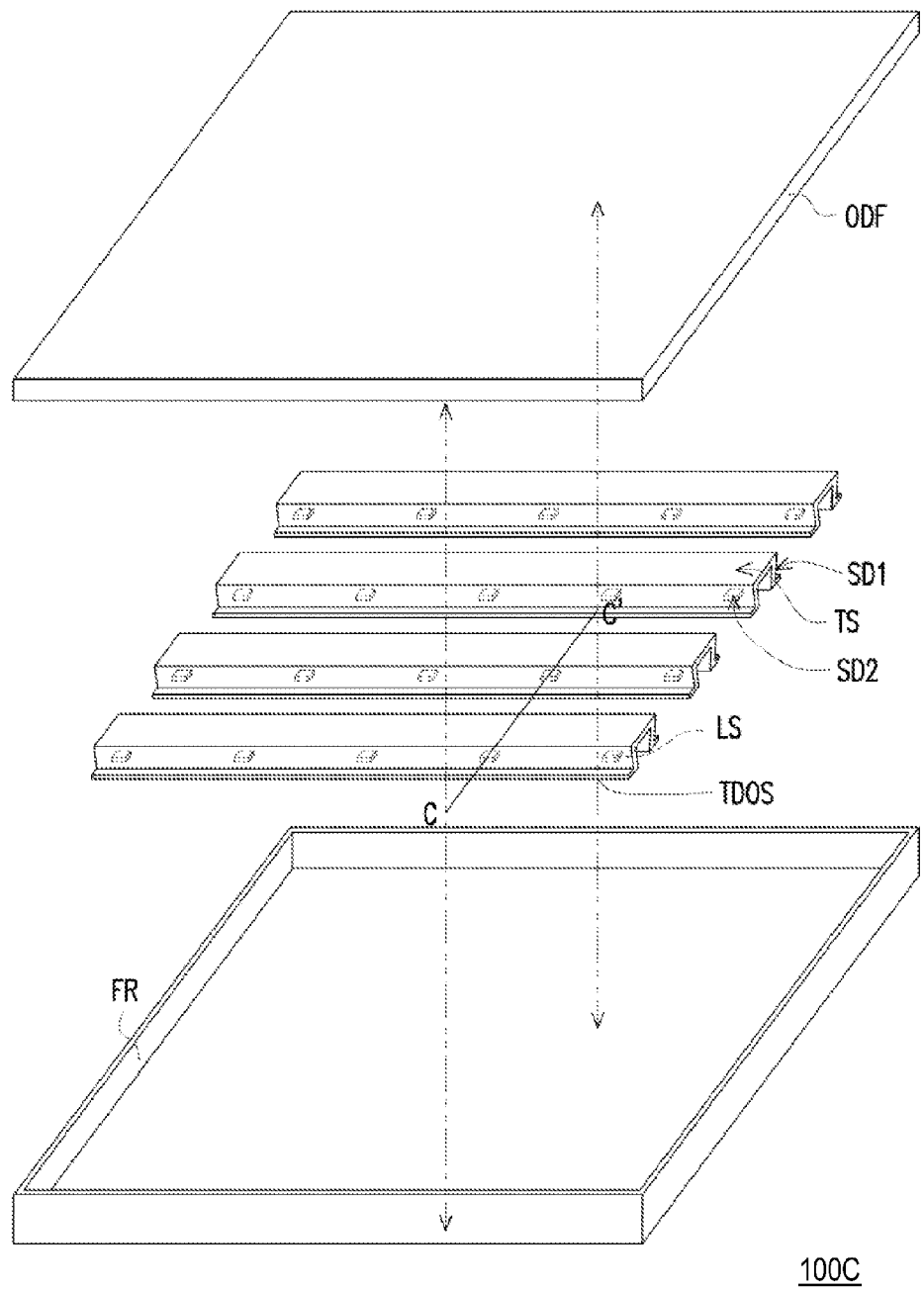
FIG. 4A is a schematic exploded view of a light source module according to an embodiment of the present invention.
Figure 4B:
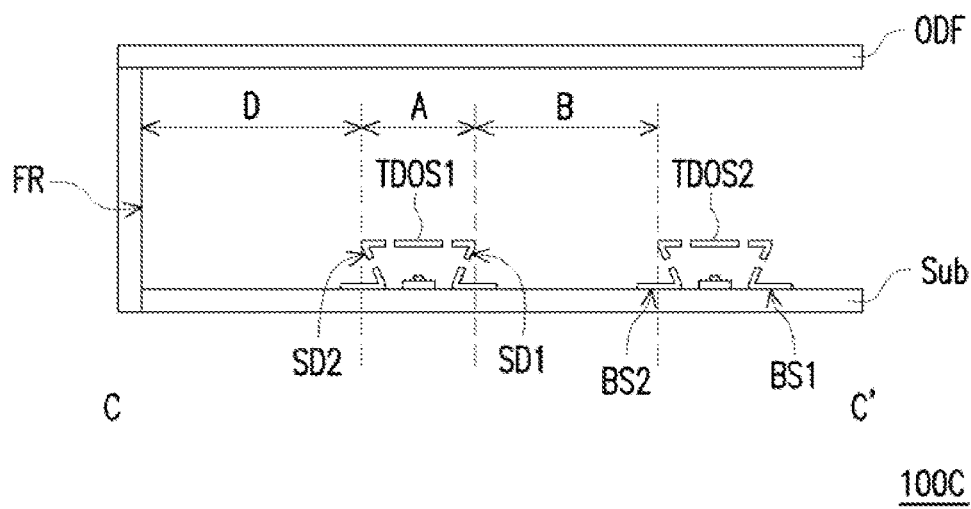
FIG. 4B is a schematic sectional view along a section line C-C' as shown in FIG. 4A.

FIG. 4A is a schematic exploded view of a light source module according to an embodiment of the present invention. FIG. 4B is a schematic sectional view along a section line C-C' as shown in FIG. 4A. A light source module 100C in FIG. 4A is the same as the light source module 100A shown in FIG. 1, and is only used to describe different section views of the light source module 100C. Therefore, same elements are represented by using same symbols and are not described in detail again. Specifically, FIG. 4B is a schematic sectional view of two three-dimensional optical control structures TDOSs and a frame FR as shown in FIG. 4A, and one of the three-dimensional optical control structures TDOSs is disposed adjacent to a side wall of the frame FR. In certain embodiments, a description of each of the three-dimensional optical control structures TDOSs is the same as that of the three-dimensional optical control structure TDOS shown in FIG. 2A; therefore, some elements are not shown, and reference may be made to the foregoing descriptions for definition.

In a section shown in FIG. 4B, the three-dimensional optical control structures TDOSs include a first three-dimensional optical control structure TDOS1 and a second three-dimensional optical control structure TDOS2. The first three-dimensional optical control structure TDOS1 is disposed adjacent to the side wall of the frame FR, and the first three-dimensional optical control structure TDOS1 is located between the side wall of the frame FR and the second three-dimensional optical control structure TDOS2. A distance between the first three-dimensional optical control structure TDOS1 and the second three-dimensional optical control structure TDOS2 is B, and a distance between the first three-dimensional optical control structure TDOS1 and the frame FR is D. The distance D and the distance B may be the same or may be different. In addition, a width of a top portion TS of each of the first three-dimensional optical control structure TDOS1 and the second three-dimensional optical control structure TDOS2 is A. A first side portion SD1 of the first three-dimensional optical control structure TDOS1 faces the second three-dimensional optical control structure TDOS2, and a total area of side light transmissive patterns BPs within a first side region of the first side portion SD1 divided by an area of the first side region S1. In addition, a second side portion SD2 of the first three-dimensional optical control structure TDOS1 faces the side wall of the frame FR, a total area of side light transmissive patterns BPs within a second side region of the second side portion SD2 divided by an area of the second side region is S2, and $0.3\times(B/A)<S1/T<0.6\times(B/A)$ and $0.3\times(D/A)<S2/T<0.6\times(D/A)$. When the first three-dimensional optical control structure TDOS1, the second three-dimensional optical control structure TDOS2, the side light transmissive patterns BPs, and the side wall of the frame FR satisfy the foregoing condition, the light source module 100C can achieve an effect of uniform light distribution, and prevent a phenomenon of non-uniform brightness of an image.

Similarly, as shown in FIG. 4B, because the first three-dimensional optical control structure TDOS1 and the second three-dimensional optical control structure TDOS2 each include a first bottom portion BS1 and a second bottom portion BS2, a spacer does not need to be additionally provided to support each of the three-dimensional optical control structures. In other words, designs of the first three-dimensional optical control structure TDOS1 and the second three-dimensional optical control structure TDOS2 can also achieve effects of reducing material and assembly costs and the like.

Figure 5:
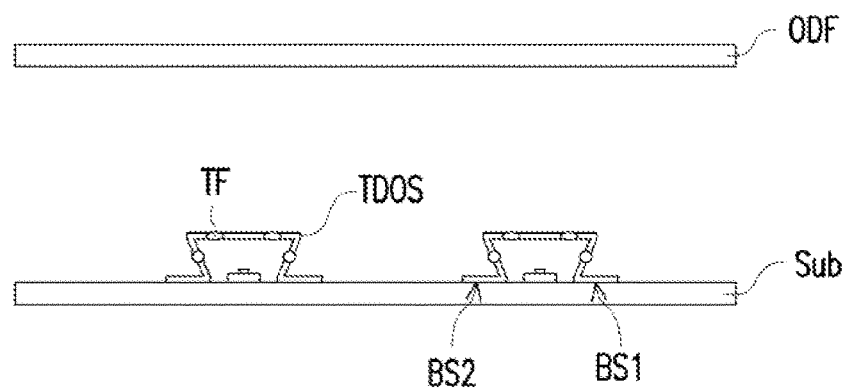
FIG. 5 is a schematic sectional view of a light source module according to another embodiment of the present invention.

FIG. 5 is a schematic sectional view of a light source module according to another embodiment of the present invention. A sectional view of a light source module 200 in FIG. 5 is similar to that of the light source module 100A shown in FIG. 2A to FIG. 2C; therefore, some elements are not shown, and are not described in detail again. A difference between the embodiment in FIG. 5 and the embodiment in FIG. 2A only lies in that, the top light transmissive patterns TPs and the side light transmissive patterns BPs in FIG. 2A are opening pattern. In comparison, top light transmissive patterns TPs and side light transmissive patterns BPs in FIG. 5 are transmissive material patterns TFs, but are not limited thereto. For example, in another embodiment, the top light transmissive patterns TPs and the side light transmissive patterns BPs may be a combination of opening patterns and transmissive material patterns TFs. That is, the top light transmissive patterns TPs and the side light transmissive patterns BPs may be formed by combining a plurality of opening patterns and a plurality of transmissive material patterns TFs.

Similarly, because each of three-dimensional optical control structures TDOSs shown in FIG. 5 includes a first bottom portion BS1 and a second bottom portion BS2, a spacer does not need to be additionally provided to support each of the three-dimensional optical control structures. In other words, a design of the three-dimensional optical control structure TDOS in FIG. 5 can also achieve effects of reducing material and assembly costs and the like.

Figure 6:
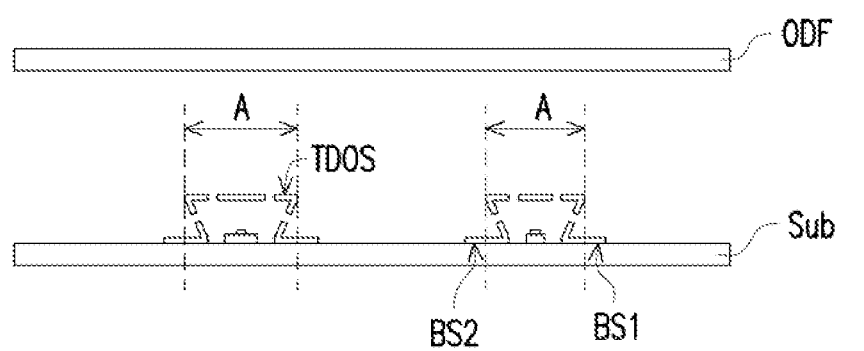
FIG. 6 is a schematic sectional view of a light source module according to another embodiment of the present invention.

FIG. 6 is a schematic sectional view of a light source module according to another embodiment of the present invention. A section of a light source module 300 in FIG. 6 is similar to that of the light source module 100A shown in FIGS. 2A-C; therefore, some elements are not shown, and are not described in detail again. A difference between the embodiment in FIG. 6 and the embodiment in FIG. 2A only lies in that, the width of the top portion TS of each of the three-dimensional optical control structures TDOSs as shown in FIG. 2A is A, and the widths A of all the three-dimensional optical control structures TDOSs are the same. In comparison, in the embodiment in FIG. 6, a width of a top portion TS of each of three-dimensional optical control structures TDOSs of the light source module 300 is A, and the widths A of all the three-dimensional optical control structures TDOSs are not exactly the same.

Similarly, because each of the three-dimensional optical control structure TDOSs shown in FIG. 6 includes a first bottom portion BS1 and a second bottom portion BS2, a spacer does not need to be additionally provided to support each of the three-dimensional optical control structures. In other words, a design of the three-dimensional optical control structure TDOS as shown in FIG. 6 can also achieve effects of reducing material and assembly costs and the like.

In certain embodiments, the light source module as described in the above-mentioned embodiments may be used in a liquid crystal display device, which includes a liquid crystal display panel and the light source module as disclosed in any of the embodiments as described above.

To sum up, the light source module according to certain embodiments of the present invention includes three-dimensional optical control structures, and the three-dimensional optical control structure includes a first bottom portion and a second bottom portion. Therefore, a spacer does not need to be additionally provided to support each of the three-dimensional optical control structures. Accordingly, compared with a conventional design of an entire layer of optical films, a design of the three-dimensional optical control structure TDOS of the present invention has greatly reduced an area of a film die. Therefore, related material and assembly costs can be reduced. Similarly, because an area of the three-dimensional optical control structure TDOS of the present invention is smaller than that of a conventional optical film, a quantity of drills of dies required to form an opening pattern and die costs can be greatly reduced. In addition, top light transmissive patterns TPs and side light transmissive patterns satisfy: $0.3\times(B/A)<S/T<0.6\times(B/A)$; therefore, the light source module can achieve an effect of uniform light distribution, and prevent a phenomenon of non-uniform brightness of an image.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A light source module, comprising:
   a substrate;
   a plurality of light sources, disposed on the substrate; and
   a plurality of three-dimensional optical control structures, located above the light sources, wherein each of the three-dimensional optical control structures covers one of the light sources, and each of the three-dimensional optical control structures comprises:
   a top portion, disposed corresponding to the light source, wherein there is a plurality of top light transmissive patterns within a top region of the top portion, and a total area of the top light transmissive patterns divided by an area of the top region is T; and
   a first side portion and a second side portion, respectively connected to the top portion to support the top portion, wherein the first side portion and the second side portion each have a plurality of side light transmissive patterns, wherein a total area of side light transmissive patterns within a side region of the first side portion or the second side portion divided by an area of corresponding one of the side regions is S, wherein the top light transmissive patterns and the side light transmissive patterns satisfy:

$$0.3\times(B/A)<S/T<0.6\times(B/A),$$

wherein A represents a width of the top portion, and B represents a distance between a three-dimensional optical control structure and an adjacent three-dimensional optical control structure.

2. The light source module according to claim 1, wherein the three-dimensional optical control structures comprise
a first three-dimensional optical control structure, a second three-dimensional optical control structure, and a third three-dimensional optical control structure, wherein the second three-dimensional optical control structure and the third three-dimensional optical control structure are located at two sides of the first three-dimensional optical control structure;
a distance between the first three-dimensional optical control structure and the second three-dimensional optical control structure is B, a distance between the first three-dimensional optical control structure and the third three-dimensional optical control structure is C, and a width of a top portion of each of the first, second, and third three-dimensional optical control structures is A;
a first side portion of the first three-dimensional optical control structure faces the second three-dimensional optical control structure, and a total area of side light transmissive patterns within a first side region of the first side portion divided by an area of the first side region is S1;
a second side portion of the first three-dimensional optical control structure faces the third three-dimensional optical control structure, and a total area of side light transmissive patterns within a second side region of the second side portion divided by an area of the second side region is S2;

$$0.3\times(B/A)<S1/T<0.6\times(B/A);\text{ and}$$

$$0.3\times(C/A)<S2/T<0.6\times(C/A).$$

3. The light source module according to claim 1, further comprising a frame, wherein
the light sources and the three-dimensional optical control structures are located in the frame;
the three-dimensional optical control structures comprise a first three-dimensional optical control structure and a second three-dimensional optical control structure, the first three-dimensional optical control structure is disposed adjacent to a side wall of the frame, and the first three-dimensional optical control structure is located between the side wall of the frame and the second three-dimensional optical control structure;
a distance between the first three-dimensional optical control structure and the second three-dimensional optical control structure is B, a distance between the first three-dimensional optical control structure and the frame is D, and a width of a top portion of each of the first and second three-dimensional optical control structures is A;
a first side portion of the first three-dimensional optical control structure faces the second three-dimensional optical control structure, and a total area of side light transmissive patterns within a first side region of the first side portion divided by an area of the first side region is S1;
a second side portion of the first three-dimensional optical control structure faces the side wall of the frame, and a total area of side light transmissive patterns within a second side region of the second side portion divided by an area of the second side region is S2;

$$0.3\times(B/A)<S1/T<0.6\times(B/A);\text{ and}$$

$$0.3\times(D/A)<S2/T<0.6\times(D/A).$$

4. The light source module according to claim 1, wherein
the top portion of each of the three-dimensional optical control structures comprises a top reflection plate and top light transmissive patterns located on the top reflection plate; and
each of the first side portion and the second side portion of each of the three-dimensional optical control structures comprises a side reflection plate and side light transmissive patterns located on the side reflection plate.

5. The light source module according to claim 1, wherein the top light transmissive patterns and the side light transmissive patterns comprise opening patterns, light transmissive material patterns, or a combination thereof.

6. The light source module according to claim 1, wherein each of the three-dimensional optical control structures further comprises a first bottom portion and a second bottom portion, which are respectively connected to the first side portion and the second side portion, and are fastened on the substrate.

7. The light source module according to claim 1, wherein
a first included angle exists between the first bottom portion and the first side portion, and the first included angle is less than or equal to 90 degrees; and
a second included angle exists between the second bottom portion and the second side portion, and the second included angle is less than or equal to 90 degrees.

8. The light source module according to claim 1, wherein
sizes of top light transmissive patterns on the top portion of each of the three-dimensional optical control structures increase as distances between the top light transmissive patterns and the light source increase; and
sizes of side light transmissive patterns on the first side portion and the second side portion of each of the three-dimensional optical control structures increase as a distance between the side light transmissive patterns and the light source increase.

9. The light source module according to claim 1, wherein the widths A of the top portions of all of the three-dimensional optical control structures are not exactly the same.

10. The light source module according to claim 1, wherein the light sources are a plurality of strip light sources or are formed by arranging a plurality of point light sources into a line.

11. The light source module according to claim 1, further comprising a diffusion film, located above the three-dimensional optical control structures.

12. The light source module according to claim 11, further comprising a support component, to support the diffusion film.

13. A liquid crystal display device, comprising:
a liquid crystal display panel; and
a light source module providing light for the liquid crystal display panel, the light source module comprising:
a substrate;

a plurality of light sources, disposed on the substrate; and a plurality of three-dimensional optical control structures, located above the light sources, wherein each of the three-dimensional optical control structures covers one of the light sources, and each of the three-dimensional optical control structures comprises:

a top portion, disposed corresponding to the light source, wherein there is a plurality of top light transmissive patterns within a top region of the top portion, and a total area of the top light transmissive patterns divided by an area of the top region is T; and a first side portion and a second side portion, respectively connected to the top portion to support the top portion, wherein the first side portion and the second side portion each have a plurality of side light transmissive patterns, wherein a total area of side light transmissive patterns within a side region of the first side portion or the second side portion divided by an area of corresponding one of the side regions is S, wherein the top light transmissive patterns and the side light transmissive patterns satisfy:

$0.3 \times (B/A) < S/T < 0.6 \times (B/A)$, wherein A represents a width of the top portion, and B represents a distance between a three-dimensional optical control structure and an adjacent three-dimensional optical control structure.

14. The liquid crystal display device according to claim 13, wherein the three-dimensional optical control structures comprise a first three-dimensional optical control structure, a second three-dimensional optical control structure, and a third three-dimensional optical control structure, wherein the second three-dimensional optical control structure and the third three-dimensional optical control structure are located at two sides of the first three-dimensional optical control structure;

a distance between the first three-dimensional optical control structure and the second three-dimensional optical control structure is B, a distance between the first three-dimensional optical control structure and the third three-dimensional optical control structure is C, and a width of a top portion of each of the first, second, and third three-dimensional optical control structures is A;

a first side portion of the first three-dimensional optical control structure faces the second three-dimensional optical control structure, and a total area of side light transmissive patterns within a first side region of the first side portion divided by an area of the first side region is S1;

a second side portion of the first three-dimensional optical control structure faces the third three-dimensional optical control structure, and a total area of side light transmissive patterns within a second side region of the second side portion divided by an area of the second side region is S2;

$0.3 \times (B/A) < S1/T < 0.6 \times (B/A)$; and $0.3 \times (C/A) < S2/T < 0.6 \times (C/A)$.

15. The liquid crystal display device according to claim 13, wherein the light source module further comprises a frame, wherein the light sources and the three-dimensional optical control structures are located in the frame;

the three-dimensional optical control structures comprise a first three-dimensional optical control structure and a second three-dimensional optical control structure, the first three-dimensional optical control structure is disposed adjacent to a side wall of the frame, and the first three-dimensional optical control structure is located between the side wall of the frame and the second three-dimensional optical control structure;

a distance between the first three-dimensional optical control structure and the second three-dimensional optical control structure is B, a distance between the first three-dimensional optical control structure and the frame is D, and a width of a top portion of each of the first and second three-dimensional optical control structures is A;

a first side portion of the first three-dimensional optical control structure faces the second three-dimensional optical control structure, and a total area of side light transmissive patterns within a first side region of the first side portion divided by an area of the first side region is S1;

a second side portion of the first three-dimensional optical control structure faces the side wall of the frame, and a total area of side light transmissive patterns within a second side region of the second side portion divided by an area of the second side region is S2;

$0.3 \times (B/A) < S1/T < 0.6 \times (B/A)$; and $0.3 \times (D/A) < S2/T < 0.6 \times (D/A)$.

16. The liquid crystal display device according to claim 13, wherein the top portion of each of the three-dimensional optical control structures comprises a top reflection plate and top light transmissive patterns located on the top reflection plate; and each of the first side portion and the second side portion of each of the three-dimensional optical control structures comprises a side reflection plate and side light transmissive patterns located on the side reflection plate.

17. The liquid crystal display device according to claim 13, wherein the top light transmissive patterns and the side light transmissive patterns comprise opening patterns, light transmissive material patterns, or a combination thereof.

18. The liquid crystal display device according to claim 13, wherein each of the three-dimensional optical control structures further comprises a first bottom portion and a second bottom portion, which are respectively connected to the first side portion and the second side portion, and are fastened on the substrate.

19. The liquid crystal display device according to claim 13, wherein a first included angle exists between the first bottom portion and the first side portion, and the first included angle is less than or equal to 90 degrees; and a second included angle exists between the second bottom portion and the second side portion, and the second included angle is less than or equal to 90 degrees.

20. The liquid crystal display device according to claim 13, wherein sizes of top light transmissive patterns on the top portion of each of the three-dimensional optical control structures increase as distances between the top light transmissive patterns and the light source increase; and sizes of side light transmissive patterns on the first side portion and the second side portion of each of the three-dimensional optical control structures increase as a distance between the side light transmissive patterns and the light source increase.

\* \* \* \* \*